May 15, 1923.
J. PAULY
IMPULSE COUPLING
Filed May 17, 1921
1,454,942
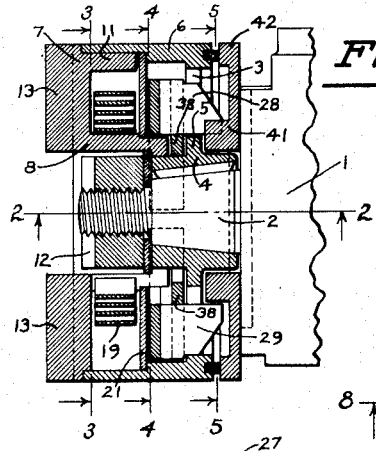
Fig.1.
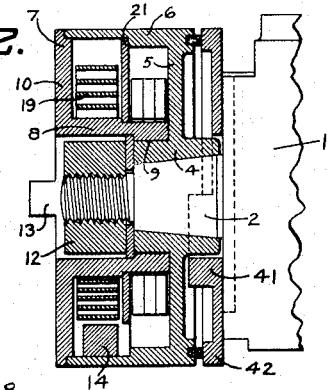
Fig.2.
Fig.7.
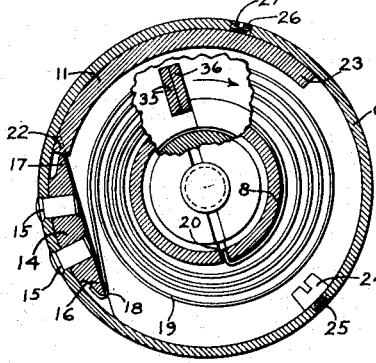
Fig.3.
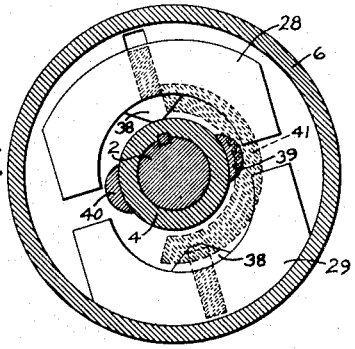
Fig.4.
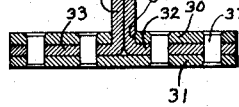
Fig.8.
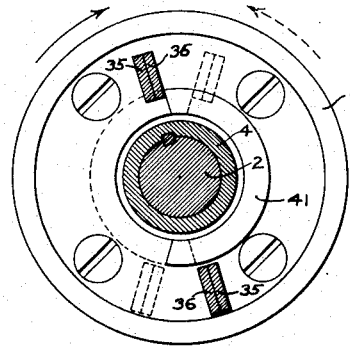
Fig.5.
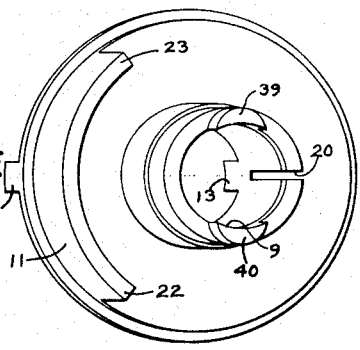
Fig.6.
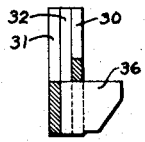
Fig.9.
INVENTOR
JOHN PAULY
BY
ATTORNEY Patented May 15, 1923.

1,454,942

UNITED STATES PATENT OFFICE.

JOHN PAULY, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK.

IMPULSE COUPLING.

Application filed May 17, 1921. Serial No. 470,298.

*To all whom it may concern:*

Be it known that I, JOHN PAULY, a citizen of the United States, residing at 151 Daviston Street, Springfield, in the county of Hampden, State of Massachusetts, have invented certain new and useful Improvements in Impulse Couplings; and I do hereby declare the following to be a full, clear, and exact description of the invention, such as will enable others skilled in the art to which it appertains to make and use the same.

The present invention relates to an impulse coupling of the type having rotatable driving and driven members and an impelling spring arranged to be stressed upon angular displacement of such members, and has reference more particularly to the locking mechanism of the coupling.

It was customary, heretofore, to form the centrifugally movable locking member, of the locking mechanism, of metal forgings. Forged metal lacks resiliency and toughness and is brittle, and such locking members or centrifugal weights, accordingly frequently became broken with the result of necessitating a frequent renewal of parts and oftentimes causing a total destruction of the coupling.

In accordance with this part of my invention, the locking member is composed of laminations fastened together to form a unitary locking member. These laminations are preferably of sheet steel, with some of the laminations hardened and tempered to withstand the impacts to which the locking member must be subjected in its use. In order that this member may cooperate with an abutment, usually provided in such couplings, one or more of the laminations are provided with engaging projections, preferably extending laterally so as to be able to contact with the abutment. Inasmuch as the impact therebetween is sudden, the invention also involves the idea of making such projections resilient, and laminated, if desired, in order that a suitable amount of yield may occur at the time of impact and, therefore, increase the time interval of impact.

In order that the locking member may be released from locking position at certain times, during the operation of the coupling, the locking member has, as another part of the invention, a cam portion formed on one of the laminations, such cam portion cooperating with the driving member whereby the locking member is released from the abutment.

In the specific form of device hereinafter described, the locking member comprises a pair of side plates with a pair of intermediate plates having laterally bent and adjacently located projections extending through a notch formed in one of the outer plates.

In the accompanying drawing illustrating a preferred form of an impulse coupling in application, as an example, to a reversible coupling of the centrifugal type in association with an engine driven magneto generating two sparks per rotation:

Fig. 1 is a view in longitudinal section of the coupling with part of the magneto shown in elevation; Fig. 2 is a similar view taken on line 2—2 of Fig. 1; Figs. 3, 4 and 5 are transverse sectional views taken on line 3—3, 4—4 and 5—5 of Fig. 1; Fig. 6 is a perspective view of the driving member; Fig. 7 is a plan view of one of the locking members or centrifugal weights; and Figs. 8 and 9 are sectional views taken on lines 8—8 and 9—9 of Fig. 7.

The impulse coupling is connected to a magneto 1 of suitable type for generating, in this case, two ignition voltages per revolution at 180° intervals. Upon the shaft 2 of the magneto is keyed a driven member 3 which has a hub 4, a rear wall 5 and a rim 6. Co-axially therewith is located a driving member 7 having a hub 8 suitably journalled at 9 on the hub 4 of the driven member, and also having a front wall 10 formed with a partial rim 11, the latter forming with the driven member an enclosing cavity for the various parts of the coupling. Both the driving and driven members are held axially on the shaft 2 by a nut 12 fastened to the threaded end of the shaft 2, while the driving member has two radial tongues 13 adapted to fit within complementary slots of a suitable coupling (not shown) adapted to be connected between the driving member and a rotating part of the engine, such as a cam shaft thereof. Within the rim 6 is secured an anchor member 14 by any suitable means, such as rivets 15, the ends 16 and 17 of this member being suitably tapered and spaced from the inner surface of the rim 6 to constitute anchor portions, over either one of which may be connected a hooked end 18 of a spiral impelling spring 19, as is clearly shown in Fig. 3 of the drawing. The ends 16 and 17 also act as abutment stops for the partial rim 11 of the driving member, as will more clearly appear hereinafter, and as is clearly shown in Fig. 3. The other end of the impelling spring 19 is suitably bent to fit within a radial slot or saw-cut 20, so that the spiral spring, having its outer end connected around the end 16 of the anchor member and its other end inserted in said saw-cut, resiliently connects the driving and driven members of the impulse coupling. This spring is preferably located in proximity of the front wall 10 of the driving member and is closed in that space by a loose washer 21.

For rotation of the impulse coupling in clockwise direction, as shown in Fig. 3, the convolutions of the spring extend in an anti-clockwise direction from its inner end fitting in the saw-cut to its outer end connected to the anchor member. In this position, it will be noted, that normally the outer end of the spring is hooked over the end 16 of the anchor member and the partial rim 11 has one of its ends 22 abutting against the end 17 of the anchor member. The coupling is, however, constructed for reverse rotation. Accordingly, for rotation in anti-clockwise direction, the spring may be located reversely or turned over so that its outer end will be hooked over the end 17 of the anchor member, and the partial rim 11 will move its other end 23 in abutting contact with the ends 16 of said anchor member. It will be observed also that the rim 6 is provided with a stop or abutment stud 24 screw-threaded into an aperture 25 for the clockwise arrangement, and when the arrangement is reversed for anti-clockwise rotation, the abutment stud 24 will be removed and inserted in the threaded opening 26, while the screw plug 27 will be removed from the latter and placed into the screw threaded opening 25. The abutment stud extends into the path of the partial rim 11 so that when the spring is stressed to its full extent at the time of releasing the locking mechanism, the end 23, in the clockwise arrangement, will be located in proximity to the stud 24, so that if the spring should break at that instant, the locking mechanism will be maintained in released condition, and the destruction of the coupling will be prevented, as will appear more clearly hereinafter.

In the remaining space of the cavity are located two locking elements 28 and 29 each generally of arcuate shape and located on opposite sides of a plane passing through the axis of rotation of the shaft 2, as is clearly shown in Fig. 4 of the drawing. Each of these members constitutes a centrifugal weight adapted by gravity and by centrifugal force, depending upon the speed of rotation of the weights, to move radially downwardly or outwardly, respectively. Each of these weights is formed from a plurality of laminations or sheet steel punchings, suitably secured together to form a unitary locking member or centrifugal weight. Referring to Figs. 7, 8 and 9, it will be observed that each of these weights comprises two side plates 30 and 31 and two intermediate plates 32 and 33. The plate 30, intermediate its ends, is formed with a suitable notch 34 through which extends a pair of laterally bent projections 35 and 36 located adjacent to each other, these projections thus forming a laminated nose. When the intermediate plates 32 and 33 are punched, the inner ends thereof are also suitably bent to form the projections 35 and 36 and are then assembled in place with such projections located in contact with each other so as to form the nose capable of extending outwardly through the notch 34. The intermediate members, with the projections 35 and 36 are preferably hardened and tempered to withstand the impacts to which the nose is subjected during the operation of the coupling as will more fully hereinafter appear. Over several plates or laminations are provided suitable registering apertures through which extend a plurality of rivets 37 adapted to permanently fasten parts together, as is clearly shown in Figs. 7 and 8. The side plate 30 is furthermore provided with a cam portion 38 extending radially inwardly for cooperation with cam members 39 and 40 formed upon the hub 8 of the driving member, as will appear more fully hereinafter.

The locking mechanism further comprises an abutment 41, constituting the outer element of the locking member, such abutment being fast or integral with a stationary supporting plate 42 in position to be successively engaged by the noses of the locking members 28 and 29 when, due to gravity, either locking member moves or falls to its innermost position, as is clearly shown in Fig. 5, and to be cleared thereby when, due to centrifugal force, the locking members retain their outermost positions. The two releasing cams 39 and 40 which project axially from the end of the hub 8 of the driving member are adapted to simultaneously engage the two cams 38 of the locking members or weights, and to thereby move the locking members outwardly to such position that their projections 35 and 36 are radially moved beyond the abutment 41. The supporting plate 42 is preferably flat and is rigidly fixed to an end face of the magneto frame by any suitable means, such as screws. This plate is so constructed and the fastening means so located that it may be angularly reversed 180° for either clockwise or anti-clockwise operation of the coupling. The plate is shown located in Fig. 1 of the drawing, with the abutment 41 in position for clockwise operation of the coupling, but it will be apparent from the above, that when the plate 42 is rotated at 180° so as to carry the abutment 41 with it, from the position shown in Fig. 4, to a position 180° therefrom, such as that shown by the dotted line position thereof in Fig. 5, the abutment member will then operate for anti-clockwise operation of the coupling. Whether the impulse coupling is arranged for either clockwise or anti-clockwise rotation, the blow received by the abutment in locking the magneto against rotation, while the shaft is slowly rotating, is received by the upper end of the abutment member 41, and owing to the fact that the projections 35 and 36 are resilient or yieldable, the force of the impact will be eased and the time interval of impact will be longer than if a rigid projection of cast metal or similar material were used.

With the abutment stud 24 in the position shown in Fig. 3 and the arrangement for clockwise rotation when the driving member is rotated and the outer locking member, such as 28, as shown in Figs. 3, 4 and 5, is in engagement with the abutment 41, the partial rim 11 will rotate in clockwise direction as well as the cams 39 and 40. As the end 23 of the rim portion 11 approaches the stop stud 24 and is about to make engagement therewith, the cams 39 and 40 will be brought into operation to radially move the locking members 28 and 29 outwardly, thereby disengaging the nose 35—36 and the weight 28 when the latter is in the position shown in Figs. 3, 4 and 5, from the end of the abutment 41. At this instant, under normal conditions, the spring will immediately operate to rotatably impel the driven member in clockwise direction, until the end 17 of the anchor member abuts with the end 22 of the rim portion 11, the latter being relatively momentarily stationary. If, however, the impelling spring 19 were broken, so that the driven member be not impelled by such spring from its locking position, when released, further movement of the driving member would bring the end 23 of the rim portion 11 against the stop stud 24, so as to thereafter carry it with the rim 11 and hence the driven member and thus cause further rotation thereof, whereby the driven member partakes of the same rotation as the driving member, it being noted that at this time, the relative positions of the driving and driven members are such that the cams 39 and 40 maintain the locking members 28 and 29 in outward position, so as to clear the stationary abutment 41. The driving and driven members then continue to rotate as a unit. In this way the total destruction of the magneto is avoided upon the breaking of the spring, it being such that if the stop stud 24 were not provided, the locking member would engage the abutment as soon as the releasing cams 39 and 40 passed the cams 38 of the locking members, so that upon further movement of the driving member, the partial rim 11 would come into contact with the end of the spring 19 hooked over the end 16 of the anchor member, whereupon the driving member would become locked and the impulse coupling would be destroyed. With the arrangement for anti-clockwise rotation the operation would be the same.

In the operation of the impulse coupling, the engine shaft, such as the cam shaft, connected with the coupling, rotates slowly either during the starting operation of the engine or when the latter is working under a heavy load, so that centrifugal force, due to the rotation of the locking members, is insufficient to overcome the action of gravity on the locking members, so that as each locking element is brought above the axis of rotation it falls by gravity to its innermost position. The driven member is driven through the impelling spring until the ends or projections 35 and 36 of the locking member come into engagement with the upper end of the abutment 41, as is clearly shown in Figs. 3, 4 and 5. The driven member, being thus locked against rotation, and as the driving member continues to rotate, it winds up the spring 19 until the releasing cams 39 and 40 are rotated to a position to engage the cams 38 and thus radially move the locking member radially outwardly to the release position. As soon as the nose is thus disengaged or cleared from the end of the abutment 41, the impelling spring having been stressed as a result of the relative angular displacement of the members, will immediately impel the driven member through the angle representing the previous angular advance of the driving member during the period of which the driven member was locked. In this impelling movement, the magneto is driven at comparatively high speed through its period of maximum generation. The ignition spark produced at that instant by the spark plug, to which the magneto is connected, will then ignite the combustible mixture in the cylinder to be fired and the engine started into operation under its own power if it is being started, or will resume its operation if it is tending to stop under a heavy load. In either case the engine speed rises above a predetermined value, such as 160 revolutions per minute, so that thereafter the locking elements are retained in their outermost position by centrifugal force, and will remain accordingly during the normal operation of the engine when the speed continues above the predetermined revolutions per minute. The driven member is then driven by the driving member through the impelling spring without appreciable retardation. If, on the other hand, the engine should fail to start into operation under its own power, or the speed does not rise above the predetermined value, the nose of the locking member will, upon movement of the driven member through 180°, come into successive engagement with the abutment 41, and the operation, previously described, will be repeated until the desired result is obtained.

I claim—

1. In an impulse coupling comprising rotatable driving and driven members and an impelling spring arranged to be stressed upon angular displacement of said members, the combination of a locking mechanism therefor comprising a laminated sheet metal locking member, an abutment arranged to be engaged thereby and mechanism for releasing said locking member from engagement with said abutment.

2. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together.

3. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together, one of said laminations having a lateral projection for engagement with said abutment.

4. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together, one of said laminations having a resilient lateral projection arranged to engage said abutment.

5. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together, and a laminated projection arranged to engage said abutment.

6. In an impulse coupling comprising rotatable driving and driven members and an impelling spring arranged to be stressed upon angular displacement of said members, the combination of a locking mechanism therefor comprising a locking member, an abutment arranged to be engaged thereby such mechanism for releasing said locking member from engagement with said abutment, said locking member comprising a plurality of laminations fastened together, and a laminated resilient projection arranged to engage said abutment.

7. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of sheet metal laminations fastened together, one of said laminations having a cam arranged to be engaged by said driving member.

8. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together, one of said laminations having a cam arranged to be engaged by said driving member, and another of said laminations having a projection arranged to engage said abutment.

9. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together, one of said laminations having a notch and another of said laminations having a laterally bent projection extending through said notch to form an engaging portion for said abutment.

10. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of laminations fastened together, an outer one of said laminations having a notch, an intermediate one of said laminations having a projection extending through said notch and arranged to engage said abutment.

11. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a pair of plates, nose pieces between said plates and extending laterally from one of said plates, and means fastening said plates and pieces together.

12. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a pair of plates, nose pieces between said plates and extending laterally from one of said plates, and means fastening said plates and pieces together, said locking member having a cam portion arranged to be engaged by said driving member.

13. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a pair of side plates, one of said side plates having a notch, a pair of intermediate plates having laterally bent projections adjacently located in and extending through said notch for engagement with said abutment, and means for fastening said plates together.

14. In an impulse coupling comprising rotatable driving and driven members and an impelling spring arranged to be stressed upon angular displacement of said members, the combination of a locking mechanism therefor comprising a locking member composed of sheet steel laminations fastened together, an abutment arranged to be engaged thereby and mechanism for releasing said locking member from engagement with said abutment.

15. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of sheet steel laminations fastened together, one of said laminations being tempered and having a projection arranged to engage said abutment.

16. In an impulse coupling comprising rotatable driving and driven members and an impelling spring arranged to be stressed upon angular displacement of said members, the combination of a locking mechanism therefor comprising a locking member, an abutment arranged to be engaged thereby and mechanism for releasing said locking member from engagement with said abutment, said locking member comprising a plurality of sheet steel laminations fastened together, one of said laminations being tempered and having a cam portion arranged to be engaged by said driving member.

In testimony whereof I affix my signature.

JOHN PAULY.